United States Patent [19]

Lu

[11] Patent Number: 4,615,941

[45] Date of Patent: Oct. 7, 1986

[54] OPAQUE PEARLESCENT FILMS CONTAINING DISPERSED INCOMPATIBLE POLYMER AND POLYMERIC INTERFACIAL AGENT

[75] Inventor: Pang-Chia Lu, Pittsford, N.Y.

[73] Assignee: Mobil Oil Corporation, New York, N.Y.

[21] Appl. No.: 686,809

[22] Filed: Dec. 27, 1984

[51] Int. Cl.$^4$ .......................... B32B 5/16; B32B 27/06
[52] U.S. Cl. .................................... 428/327; 428/332; 428/474.4; 428/475.5; 428/480; 428/500
[58] Field of Search ............. 428/213, 327, 364, 480, 428/332, 474.4, 475.5, 500; 525/166

[56] References Cited

U.S. PATENT DOCUMENTS

| | | | |
|---|---|---|---|
| 4,368,295 | 1/1983 | Newton et al. | 525/166 |
| 4,377,616 | 3/1983 | Ashcraft et al. | 428/213 |
| 4,510,743 | 4/1985 | de Kroon | 428/364 X |

*Primary Examiner*—Thomas J. Herbert
*Attorney, Agent, or Firm*—Alexander J. McKillop; Michael G. Gilman; Edward J. Trojnar

[57] ABSTRACT

Opaque pearlescent polymer films, e.g., polypropylene, containing finely dispersed particles of an incompatible polymer e.g., nylon, are improved by blending a polymeric interfacial agent with the film polymer and the incompatible polymer to give a film having the incompatible polymer dispersed in smaller spherical particles and reduced stringness.

16 Claims, No Drawings

OPAQUE PEARLESCENT FILMS CONTAINING DISPERSED INCOMPATIBLE POLYMER AND POLYMERIC INTERFACIAL AGENT

CROSS-REFERENCE TO RELATED APPLICATIONS

In my concurrently filed application entitled "OPAQUE PEARLESCENT FILM CONTAINING BLENDS OF POLYMERS FOR IMPROVED DISPERSION OF INCOMPATIBLE POLYMER PHASE" there are disclosed opaque polymeric films containing a dispersed phase of incompatible polymer as the opacifying agent. Improved opacity is obtained by virtue of finer dispersion of the incompatible polymer by the addition of a polymer to the continuous film phase to alter its melt rheology and to cause dispersion of the incompatible polymer in small spherical particles with reduced stringiness.

BACKGROUND OF THE INVENTION

Opaque polymeric films in which the opacifying agent is finely divided polymer dispersed in the continuous film polymer phase are described in U.S. Pat. Nos. 4,368,295 and 4,377,616, which are incorporated herein by reference in entirety. U.S. Pat. No. 4,368,295 discloses opaque polyester films containing dispersed polypropylene and a carboxylated polyethylene additive.

In U.S. Pat. No. 4,377,616, a film is prepared by melting a mixture of a major proportion of a film forming polymer such as polypropylene and a minor proportion of an incompatible polymer which has a higher melting point, at a temperature sufficient to melt the incompatible polymer and to dispense it in the film forming polymer, extruding the mixture into a film and biaxially orienting the film. The dispersed incompatible polymer provides sites for the formation of voids surrounding the dispersed polymer particles. These voids provide opacity and give the film an attractive pearlescent sheen. Reduction of the size of the dispersed particles and reduction of the occurrence of stringiness in those particles, as sometimes occurs, results in a film having improved opacity and better appearance. Such improvements are provided in accordance with this invention.

SUMMARY OF THE INVENTION

This invention relates to improvements in opaque polymeric films containing finely dispersed incompatible polymer as the opacifying agent. Particle size and stringiness in the dispersed incompatible polymeric phase are reduced by incorporating a polymeric interfacial agent in the mixture of polymers.

DETAILED DESCRIPTION OF THE INVENTION

The opaque polymeric films of the invention containing finely dispersed incompatible polymer as the opacifying agent are improved by the incorporation into the polymeric blend prior to formation of the film of an interfacial polymeric additive. The interfacial additive generally has a polymeric moiety which is similar to the polyolefin film forming polymer and a moiety which is more compatible with the polymer of the dispersed phase. For example, the moiety which is compatible with the polyolefin film forming phase is advantageously a polyolefin moiety such as polyethylene or polypropylene. The moiety which is more compatible with the dispersed phase is advantageously a carboxylic acid, carboxylic salt, carboxylic acid ester or carboylic acid amide group. Preferably, carboxylic acid or carboxylic acid salt derivatives of ethylene or propylene copolymers are used. Such materials include copolymers of ethylene with the appropriate monomer such as acrylic acid, methacrylic acid, or esters such as acrylates, methacrylates and vinyl acetates. The carboxylic acid group can be introduced after formation of the polymer as disclosed in U.S. Pat. No. 4,368,295. Particularly suitable are the "Surlyn" ionomer resins available from DuPont which are believed to be certain salts of polymers of ethylene copolymerized with a carboxylic acid monomer.

The polymeric interfacial agent is added in an amount which is effective to reduce the size of the dispersed polymer particles and to reduce the stringiness observed in the dispersed polymer. Particularly effective additives will result in a film in which the dispersant size is 8 microns or less and which has very few, if any, stringiness in the dispersed phase. It is preferred to include the additive in amounts sufficient to obtain a particle size of 5 microns or less and preferably 3 microns or less with no stringiness in the particles. Generally, levels of additives in the range of 0.5 to 10 weight percent can be used. However, excesses are to be avoided because the particle size becomes too small and opacity is reduced. Preferably, the additive is in an amount of ranging from about 1 to about 4 weight percent. About 2 weight percent has been found suitable with particularly effective additives.

The methods for preparing the films described in U.S. Pat. No. 4,377,616 can be used herein. As described in the patent, the films can contain additional components such as inorganic fillers and the like. Similarly, the films can contain one or more additional layers to achieve high gloss, heat sealability or other desired characteristics.

The invention is illustrated by the following non-limiting examples. All parts are by weight unless otherwise specified.

EXAMPLES 1-8

A series of films from resin blends comprising 15 weight percent Nylon-6 (Allied 8207F), the indicated amount of polymeric interfacial additive, the remainder being polypropylene, were prepared.

Extrusion tests were conducted by dry blending resin mixtures and cast extruding the blends into 10 mil sheets using ¾" Brabender extruder equipped with a two-stage mixing screw. The sheets were then biaxially oriented on a T.M. Long Orientor.

The distribution of the resin components in the extrudate were examined optically. The surface and the cross-sections of the cast films were stained with aqueous iodine solution for one minute and then examined under an optical microscope. Polar components, such as Nylon, appeared as dark brown areas, while the polypropylene was not affected by the staining.

| Example | % Additive | Dispersant Size (microns) | Nylon Strings |
|---|---|---|---|
| Control | 0 | 7 | Several |
| 1 | 2% Kenamide S-180 | 7.5 | Several |
| 2 | 2% Modic 300M | 5 | Some |
| 3 | 2% EMA 2207 | 5 | Few |
| 4 | 2% PEOX 500 | 4 | Some |

-continued

| Example | % Additive | Dispersant Size (microns) | Nylon Strings |
|---|---|---|---|
| 5 | 2% AC-400 | 3 | Some |
| 6 | 2% Plexar 2511 | 2.5 | Few |
| 7 | 2% EAA-459 | 2.5 | None |
| 8 | 2% Surlyn 1652 | 2.5 | None |

The interfacial additives listed above are identified in the Table below.

TABLE I

INTERFACIAL ADDITIVES FOR NYLON/PP RESIN BLENDS

| Product | Chemical Description | Producer |
|---|---|---|
| EMA 2207 | Ethylene Methylacrylate | Gulf |
| EAA-459 | Ethylene Acrylic Acid | Dow |
| Surlyn 1652 | Ionomer | DuPont |
| AC-400 | Ethylene Vinyl Acetate | Allied |
| Plexar 2511 | Anhydride Modified PP | Chemplex |
| Modic P-300M | Anhydride Modified PP | Mitsubishi |
| PEOX 500 | Polyethyloxazoline | Dow |
| Kenamide S-180 | Stearyl Stearamide | Witco |

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

I claim:

1. In an opaque to translucent, biaxially oriented melt extruded polymeric film comprising a continous phase of a polyolefin first polymer; and a discontinuous dispersed phase of a finely divided second polymer comprising a polyamide or polyester which is incompatible with said first polymer comprising a polyolefin; the improvement comprising including in said film a third polymer comprising a copolymer of ethylene and a carboxyl containing monomer or a salt thereof as an interfacial agent in an amount sufficient to disperse said second polymer in smaller particles with fewer stringy particles than in the film made without said polymeric interfacial agent.

2. The film of claim 1 having a transparent, thermoplastic coating on at least one surface thereof.

3. The film of claim 1 in which said second polymer has a higher melting point than said first polymer.

4. The film of claim 1 in which said first polymer is polypropylene.

5. The film of claim 4 in which said second polymer is a polyamide.

6. The film of claim 5 in which said polyamide is nylon-6.

7. The film of claim 5 in which said average particle size of said second polymer is less than 8 microns.

8. The film of claim 5 having a transparent, thermoplastic coating on at least one surface thereof.

9. The film of claim 1 in which said second polymer is a polyamide.

10. The film of claim 9 in which said polyamide is nylon-6.

11. The film of claim 9 in which said average particle size of said second polymer is less than 8 microns.

12. The film of claim 9 having a transparent, thermoplastic coating on at least one surface thereof.

13. The film of claim 1 in which said second polymer is a polyester.

14. The film of claim 5 in which said average particle size of said second polymer is less than 8 microns.

15. The film of claim 13 having a transparent, thermoplastic coating on at least one surface thereof.

16. The film of claim 1 in which said average particle size of said second polymer is less than 8 microns.

* * * * *